DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 11

T926,009

FIRE-RETARDANT POLYCARBONATES

Jurgen H. Exner, 1823 Eastlawn, and Eric R. Larsen, 314 W. Meadowbrook, both of Midland, Mich. 48640

Filed Jan. 28, 1974, Ser. No. 437,424

**Int. Cl. C08d *7/10***

U.S. Cl. 260—45.7 R

No Drawing. 6 Pages Specification

Polycarbonates are rendered fire retardant by admixing therewith a fire-retarding compound of the general formula

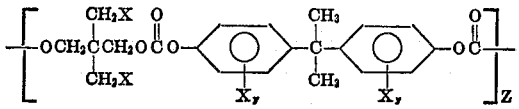

where X is Br or Cl, $y$ is an integer from 0 to 4 and Z is greater than 1.